US008438011B2

(12) United States Patent
Udupa et al.

(10) Patent No.: US 8,438,011 B2
(45) Date of Patent: May 7, 2013

(54) SUGGESTING SPELLING CORRECTIONS FOR PERSONAL NAMES

(75) Inventors: Uppinakuduru Raghavendra Udupa, Bangalore (IN); Shaishav Kumar, Bangalore (IN)

(73) Assignee: Microsoft Corporation, Redmond, WA (US)

(*) Notice: Subject to any disclaimer, the term of this patent is extended or adjusted under 35 U.S.C. 154(b) by 318 days.

(21) Appl. No.: 12/957,305

(22) Filed: Nov. 30, 2010

(65) Prior Publication Data

US 2012/0136650 A1 May 31, 2012

(51) Int. Cl.
*G06F 17/273* (2006.01)
(52) U.S. Cl.
USPC ............................................. 704/9; 707/706
(58) Field of Classification Search ........ 704/9; 707/706
See application file for complete search history.

(56) References Cited

U.S. PATENT DOCUMENTS

| | | | |
|---|---|---|---|
| 7,296,019 B1 | 11/2007 | Chandrasekar et al. | |
| 7,743,078 B2 * | 6/2010 | Azvine et al. | 707/803 |
| 8,320,735 B2 * | 11/2012 | Tanaka et al. | 386/239 |
| 2009/0319257 A1 | 12/2009 | Blume et al. | |
| 2009/0319521 A1 | 12/2009 | Groeneveld et al. | |
| 2010/0180199 A1 | 7/2010 | Wu et al. | |
| 2012/0323877 A1 * | 12/2012 | Ray et al. | 707/706 |

OTHER PUBLICATIONS

Martins, et al., "Spelling Correction for Search Engine Queries", Retrieved at << http://citeseerx.ist.psu.edu/viewdoc/download?doi=10.1.1.107.4113&rep=rep1&type=pdf >>, in Proceedings of EsTAL-04, Espana for Natural Language Processing, Lecture Notes in Computer Science, vol. 3230, 2004, pp. 12.
Galvez, et al., "Approximate Personal Name-Matching Through Finite-State Graphs", Retrieved at << http://www.ugr.es/~cgalvez/Galvez-Jasist.pdf >>, Journal of the American Society for Information Science and Technology, vol. 58, Issue 13, Nov. 2007, pp. 1960-1976.
Pu, et al., "Keyword Query Cleaning", Retrieved at << http://www.vldb.org/pvldb/1/1453955.pdf >>, Proceedings of the VLDB Endowment, vol. 01, Issue 01, Aug. 2008, pp. 909-920.
Zobel, et al., "Finding Approximate Matches in Large Lexicons", Retrieved at << http://citeseerx.ist.psu.edu/viewdoc/download?doi=10.1.1.14.3856&rep=rep1&type=pdf >>, Software—Practice & Experience, vol. 25, Issue 03, Mar. 1995, pp. 331-345.

(Continued)

*Primary Examiner* — Susan McFadden
(74) *Attorney, Agent, or Firm* — Lyon & Harr, LLP; Richard T. Lyon

(57) ABSTRACT

Personal name spelling correction suggestion technique embodiments are presented which provide suggestions for alternate spellings of a personal name. This involves creating a personal name directory which can be queried to suggest spelling corrections for personal names. A hash function that maps any personal name in a particular language and misspellings thereof to similar binary codewords is used to produce one or more binary codewords for each personal name in the directory. The same hash function is used to produce one or more binary codewords from a personal name presented in a query. The personal name directory is employed to identify up to a prescribed number of personal names, each of which has one or more associated binary codewords that are similar to one or more of the binary codewords produced from the personal name query. The identified personal names are suggested as alternate names for the query personal name.

20 Claims, 9 Drawing Sheets

OTHER PUBLICATIONS

Ahmad, et al., "Learning a spelling error model from search query logs", Retrieved at << http://acl.ldc.upenn.edu/H/H05/H05-1120.pdf?q=model-checking-multiple-logs >>, Proceedings of the conference on Human Language Technology and Empirical Methods in Natural Language Processing, 2005, pp. 955-962.

Andoni, et al., "Near-optimal hashing algorithms for approximate nearest neighbor in high dimensions", Retrieved at << http://citeseerx.ist.psu.edu/viewdoc/download?doi=10.1.1.142.3471&rep=rep1&type=pdf >>, Proceedings of the 47th Annual IEEE Symposium on Foundations of Computer Science, Oct. 21-24, 2006, pp. 117-122.

Bhagat, et al., "Phonetic models for generating spelling variants", Retrieved at << http://citeseerx.ist.psu.edu/viewdoc/download?doi=10.1.1.71.7909&rep=rep1&type=pdf >>, Proceedings of the 20th international joint conference on Artifical intelligence, 2007, pp. 6.

Bilenko, et al., "Adaptive name matching in information integration", Retrieved at << http://citeseerx.ist.psu.edu/viewdoc/download?doi=10.1.1.64.4738&rep=rep1&type=pdf >>, Journal IEEE Intelligent Systems, vol. 18, Issue 05, Sep. 2003, pp. 16-23.

Brill, et al., "An improved error model for noisy channel spelling correction", Retrieved at << http://acl.ldc.upenn.edu/P/P00/P00-1037.pdf >>, Proceedings of the 38th Annual Meeting on Association for Computational Linguistics, Jan. 2000, pp. 8.

Kernighan, et al., "A spelling correction program based on a noisy channel model", Retrieved at << http://acl.ldc.upenn.edu/C/C90/C90-2036.pdf >>, Proceedings of the 13th conference on Computational linguistics, vol. 02, 1990, pp. 205-210.

Kukich, Karen, "Techniques for automatically correcting words in a text", Retrieved at << http://dc-pubs.dbs.uni-leipzig.de/files/Kukich1992Techniqueforautomatically.pdf >>, Proceedings of the 1993 ACM conference on Computer science, vol. 24, Issue 04, Dec. 1992, pp. 377-439.

Navarro, et al., "Matchsimile: a flexible approximate matching tool for searching proper names", Retrieved at << http://kitt.cl.uzh.ch/clab/satzaehnlichkeit/tutorial/Unterlagen/Navarro2003.pdf >>, Journal of the American Society for Information Science and Technology, vol. 54, Issue 01, Jan. 2003, pp. 3-15.

Pfeifer, et al, "Retrieval effectiveness of proper name search methods", Retrieved at << http://citeseerx.ist.psu.edu/viewdoc/download?doi=10.1.1.33.2521&rep=rep1&type=pdf >>, Information Processing and Management, vol. 32, Issue 06, Nov. 1996, pp. 15.

Philips, Lawrence, "The double metaphone search algorithm", Retrieved at << http://tickett.net/dedupe/images/5/5a/Dblmetaph.rtf >>, C/C++ Users Journal, vol. 18, Issue 06, Jun. 2000, pp. 4.

Ristad, et al., "Learning string edit distance", Retrieved at << http://arxiv.org/PS_cache/cmp-lg/pdf/9610/9610005v3.pdf >>, IEEE Transactions on Pattern Analysis and Machine Intelligence, vol. 20, Issue 05, May 1998, pp. 31.

Salakhutdinov, et al., "Semantic hashing", Retrieved at << http://citeseerx.ist.psu.edu/viewdoc/download?doi=10.1.1.112.5426&rep=rep1&type=pdf >>, International Journal of Approximate Reasoning, vol. 50, Issue 07, Jul. 2009, pp. 8.

Sun, et al., "Learning phrase-based spelling error models from clickthrough data", Retrieved at << http://research.microsoft.com/en-us/um/people/jfgao/paper/116_camera-ready.pdf >>, Proceedings of the 48th Annual Meeting of the Association for Computational Linguistics, 2010, pp. 9.

Toutanova, et al., "Pronounciation modeling for improved spelling correction", Retrieved at << http://acl.ldc.upenn.edu/acl2002/MAIN/pdfs/Main336.pdf >>, Proceedings of the 40th Annual Meeting on Association for Computational Linguistics, Jul. 2002, pp. 8.

Weiss, et al., "Spectral hashing", Retrieved at << http://citeseerx.ist.psu.edu/viewdoc/download?doi=10.1.1.141.7577&rep=rep1&type=pdf >>, Advances in Neural Information Processing Systems, 2008, pp. 1-9.

Whitelaw, et al., "Using the web for language independent spellchecking and autocorrection", Retrieved at << http://www.aclweb.org/anthology/D/D09/D09-1093.pdf >>, Proceedings of the 2009 Conference on Empirical Methods in Natural Language Processing, vol. 02, Aug. 2009, pp. 890-899.

Charikar, Moses S., "Similarity estimation techniques from rounding algorithms", Retrieved at << http://citeseerx.ist.psu.edu/viewdoc/download?doi=10.1.1.110.1930&rep=rep1&type=pdf >>, Proceedings of the thiry-fourth annual ACM symposium on Theory of computing, May 19-21, 2002, pp. 9.

Chen, et al., "Improving query spelling correction using web search results", Retrieved at << http://acl.ldc.upenn.edu/D/D07/D07-1019.pdf >>, Proceedings of the Joint Conference on Empirical Methods in Natural Language Processing and Computational Natural Language Learning, Jun. 2007, pp. 181-189.

Christen, et al., "A comparison of personal name matching: techniques and practical issues", Retrieved at << http:// citeseerx.ist.psu.edu/viewdoc/download?doi=10.1.1.69.3456&rep=rep1&type=pdf >>, Proceedings of the Sixth IEEE International Conference on Data Mining, Dec. 2006, pp. 14.

Cohen, et al., "A comparison of string distance metrics for name-matching tasks", Retrieved at << http://citeseerx.ist.psu.edu/viewdoc/download?doi=10.1.1.15.178&rep=rep1&type=pdf >>, Proceedings of IJCAI-03 Workshop on Information Integration, Aug. 2003, pp. 6.

Cucerzan, et al., "Spelling correction as an iterative process that exploits the collective knowledge of web users", Retrieved at << http://acl.ldc.upenn.edu/acl2004/emnlp/pdf/Cucerzan.pdf >>, Proceedings of the 2004 Conference on Empirical Methods in Natural Language Processing, A meeting of SIGDAT, a Special Interest Group of the ACL, held in conjunction with ACL, Jul. 25-26, 2004, pp. 8.

Damerau, Fred J., "A technique for computer detection and correction of spelling errors", Retrieved at << http://tickett.net/dedupe/images/c/c0/Acm_march1964.pdf >>, Communications of the ACM, vol. 07, Issue 03, Mar. 1964, pp. 171-176.

Friedman, et al., "Tolerating spelling errors during patient validation", Retrieved at <<http://www.cs.utah.edu/contest/2005/spellingErrors.pdf >>, Journal Computers and Biomedical Research, vol. 25, Issue 05, Oct. 1992, pp. 486-509.

Golding, et al., "Applying winnow to context-sensitive spelling correction", Retrieved at << http://arxiv.org/PS_cache/cmp-lg/pdf/9607/9607024v1.pdf >>, Proc. of the International Conference on Machine Learning (ICML), Jul. 19, 1996, pp. 9.

Hardoon, et al., "Canonical correlation analysis: An overview with application to learning methods", Retrieved at << http://citeseerx.ist.psu.edu/viewdoc/download?doi=10.1.1.14.6452&rep=rep1&type=pdf >>, Journal Neural Computation, vol. 16, Issue 12, Dec. 2004, pp. 39.

Islam, et al., "Real-word spelling correction using google web 1tn-gram data set", Retrieved at << http://www.site.uottawa.ca/~diana/publications/sp0435-islam.pdf >>, Proceeding of the 18th ACM conference on Information and knowledge management, Nov. 2-6, 2009, pp. 4.

Shakhnarovich, et al., "Nearest-neighbor methods in learning and vision", Retrieved at << http://vlm1.uta.edu/~athitsos/publications/ann2006_chapter6.pdf >>, IEEE Transactions on Neural Networks, 2006, pp. 1-26.

Jurafsky, D., J. H. Martin, Speech and language processing, An introduction to natural language processing, computational linguistics, and speech recognition, (2nd Edition), Chapter 1—Introduction, May 26, 2008, pp. 1-17.

* cited by examiner

SUGGESTING SPELLING CORRECTIONS FOR PERSONAL NAMES

BACKGROUND

Over the last few years, people search has emerged as an important on-line search service. Unlike general searches where users are looking for information on a wide range of topics including people, products, news, events, etc., people search is about people. Hence, personal names are used predominantly as queries in people search. However, it is known that a significant percentage of queries in people search are misspelled.

Spelling errors in personal names are of a different nature compared to those in general text. Long before people search became widely popular, researchers working on the problem of personal name matching had recognized the human tendency to be inexact in recollecting names from the memory and specifying them. A study of personal names in hospital databases found that only 39% of the errors in the names were single typographical errors, whereas 80% of misspelled words in general text are due to single typographical errors. Further, multiple typographical errors, phonetic errors, cognitive errors and word substitutions are observed relatively more frequently in personal names compared to general text.

In addition to within-the-word errors, people search queries can be plagued by errors that are not usually seen in general text. For instance, one study discovered that 36% of the errors were due to addition or deletion of a word.

SUMMARY

Personal name spelling correction suggestion technique embodiments described herein generally provide suggestions for alternate spellings of a personal name. In one general embodiment this involves creating a personal name directory which can be queried to suggest spelling corrections for personal names. A hashing-based scheme is used to characterize the personal names in the directory. More particularly, in one general implementation for creating a personal name directory which can be queried to suggest spelling corrections for a personal name, a hash function is computed that maps any personal name in a particular language and misspellings thereof to similar binary codewords. Once the hash function has been computed, it is used to produce one or more binary codewords for each personal name in the aforementioned language that is found in the personal name directory. The codeword or codewords produced for each personal name are then associated with that name in the directory.

The same hashing-based scheme can also be used to characterize a personal name included in query prior to it being used to obtain suggested spelling corrections for the name from the directory. More particularly, in one general implementation for providing one or more suggested spelling corrections for a personal name included in a query, a personal name query that includes a personal name in the aforementioned particular language is input. The hash function is then used to produce one or more binary codewords from the query personal name. Next, the previously constructed personal name directory is employed to identify up to a prescribed number of personal names, each of which has one or more of the associated binary codewords that are similar to one or more of the binary codewords produced from the personal name query. The identified personal names are then designated as potential personal name corrections. Then one or more of the potential personal name corrections are suggested as alternate names for the personal name from the personal name query.

It should also be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

In the following description of personal name spelling correction suggestion technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Personal Name Spelling Correction Suggestions

Personal name spelling correction suggestion technique embodiments described herein generally involve creating a personal name directory which can be queried to suggest spelling corrections for personal names. A hashing-based scheme is used to characterize the personal names in the directory. The same hashing-based scheme can also be used to characterize a personal name included in query prior to it being used to obtain suggested spelling corrections for the name from the directory. Generally, given a query, it is desired to return the global best match, or up to a prescribed number of the top matches, from the personal name directory.

Figure 1:
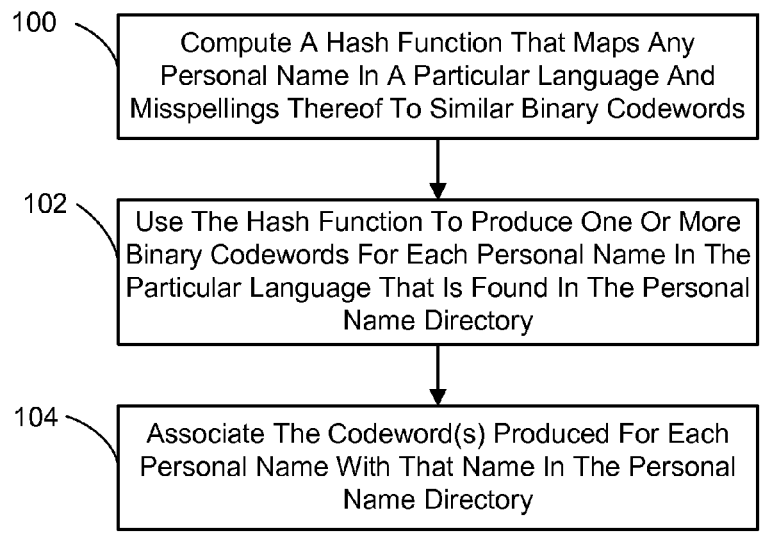
FIG. 1 is a flow diagram generally outlining one embodiment of a process for creating a personal name directory which can be queried to suggest spelling corrections for a personal name.

Referring to FIG. 1, in one general implementation for creating a personal name directory which can be queried to suggest spelling corrections for a personal name, a hash function is computed that maps any personal name in a particular language and misspellings thereof to similar binary codewords (100). A binary codeword is considered similar to another binary codeword if a distance measure computed between that pair of codewords is less than a prescribed distance threshold. Once the hash function has been computed, it is used to produce one or more binary codewords for each personal name in the aforementioned language that is found in the personal name directory (102). The codeword or codewords produced for each personal name are then associated with that name in the directory (104).

Figure 2:
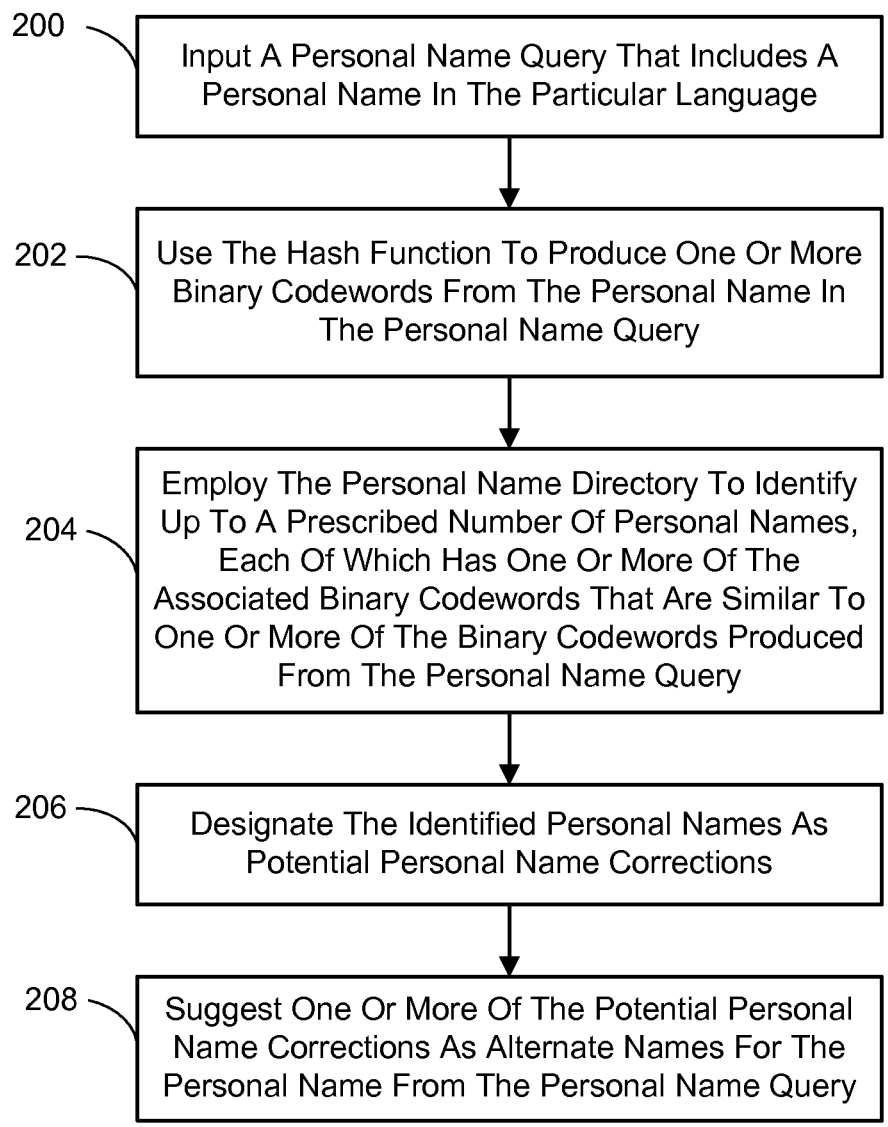
FIG. 2 is a flow diagram generally outlining one embodiment of a process for providing one or more suggested spelling corrections for a personal name included in a query.

Referring now to FIG. 2, a general implementation for providing one or more suggested spelling corrections for a personal name included in a query is presented. First, a personal name query that includes a personal name in the aforementioned particular language is input (200). The aforementioned hash function is used to produce one or more binary codewords from the personal name in the personal name query (202). Next, the previously constructed personal name directory is employed to identify up to a prescribed number of personal names, each of which has one or more of associated binary codewords that are similar to one or more of the binary codewords produced from the personal name query (204). The identified personal names are then designated as potential personal name corrections (206), and one or more of the potential personal name corrections are suggested as alternate names for the personal name found in the query (208).

1.1 Learning Hash Functions

In order to expedite the query matching process, especially for large name directories, in one embodiment the query search is performed in two stages-namely a name bucketing stage and a name matching stage. In the name bucketing stage, for each token of the query, an approximate nearest neighbor search of the name tokens of the directory is done to produce a list of candidate matches (i.e., tokens that are approximate matches of the query token). For the purposes of this description, a token is defined as a word in a personal name exhibiting a continuous string of characters unbroken by a space and whose characters are consistent with the types of characters employed in personal names in the language of the name. Using the aforementioned list of candidate tokens, a list of candidate names is extracted which contain at least one of the approximately matching tokens. In the name matching stage, a rigorous matching of the query with candidate names is performed.

Success in finding the right personal name suggestion for the query in the name matching stage depends on the success in getting the right name suggestion in the list of candidates produced by the name bucketing stage search. Therefore, employing a name similarity search technique that can ensure very high recall without producing too many candidates would be advantageous. Hashing is believed to be ideally suited for this task of fast and approximate name matching. In operation, the query tokens, as well as personal name directory tokens are generally hashed into d bit binary codewords (e.g., 32 bit codewords). With binary codewords, finding approximate matches for a query token is as easy as finding all the database tokens whose codeword is at a distance of r or less from the query token codeword (e.g., a Hamming distance). When the binary codewords are compact, this search can be done in a fraction of a second on directories containing millions of names on even a simple computing device.

The hashing procedure used to hash the personal name directory tokens and the query tokens can be performed in different ways. In one embodiment, a novel data-driven technique for learning hash functions for mapping similar names to similar binary codewords is used based on a set of personal names in a given language (i.e., monolingual data). In another embodiment, learning the hash functions for mapping similar names to similar binary codewords is based on using name equivalents in multiple languages (i.e., multilingual data). It is noted that the language of an equivalent personal name can also be in a different script from the other equivalent names. For example, in a two-language implementation of the latter approach, name pairs are used as the training data—where one of the names is in the language and script that it is anticipated the personal name queries will exhibit, and the other is the equivalent name in a different language and possibly even a different script. However in both hashing implementations, the idea is the same: learning hash functions that map similar names in the training data to similar binary codewords. The foregoing hashing implementations will be described in more detail in the sections to follow.

1.1.1 Learning a Hash Function Using Monolingual Names as Training Data

In general, the task of learning hash functions using monolingual names is formulated as an optmization problem whose relaxation can be solved as a generalized Eigenvalue problem. Let (s, s') be a pair of names from a set of name pairs $T=\{(s, s')\}$. It is noted that in one tested implementation, 30,000 single token names in English were employed in learning a monolingual name hash function. Now, let $w(s, s')$ be a measure of a name pair's similarity. In one implementation, 1—length normalized Edit Distance between s and s' was used as $w(s, s')$. More particularly, $w(s, s')$=Damerau-Levenshtein Edit distance between s and s'/max $\{|s|, |s'|\}$. Featurization of the actual names is typically employed for computational purposes in mapping the names to codewords. In one implementation each name is represented as a feature vector over character bigrams. For instance, the name token Klein has the bigrams $\{\bullet k, kl, le, ei, in, n\bullet\}$ as features. Thus, let $\phi(s) \in R^{d_1}$ be the feature representation of s. The task is to learn a hash function $f$ that maps each name to a d bit codeword: $f: s \mapsto \{-1,1\}^d$. In addition, the distance (e.g., Hamming distance) of the codeword of s to the codeword of s' will be made small when their similarity measure $w(s, s')$ is large. Further, each bit of the codewords is made to be either 1 or −1 with equal probability and the successive bits of the codewords made to be uncorrelated. These desires can be achieved using the following optimization equation:

$$\text{minimize:} \Sigma_{(s,s') \in T} w(s,s') \|f(s)-f(s')\|^2 \quad (1)$$

s.t.:

$$\Sigma_{s:(s,s') \in T} f(s)=0 \quad (2)$$

$$\Sigma_{s:(s,s')\in T} f(s)f(s)^T = \rho^2 I_d \qquad (3)$$

$$f(s), f(s') \in \{-1,1\}^d \qquad (4)$$

where $I_d$ is an identity matrix of size d×d. Note that the foregoing minimization is based on a Hamming distance of a codeword y to another codeword y' being ¼ ||y−y'||². It is also noted that the foregoing second constraint (Eq. (3)) helps avoid the trap of mapping all names to the same codeword and thereby making the Hamming error zero while satisfying the first and last constraints. It can be shown that the above minimization problem is NP-hard even for 1-bit codewords.

Further, the optimal solution gives codewords only for the names in the training data. As it is ultimately desired that f be defined for all s, the out-of-training-sample extension problem can be handled by relaxing f as follows:

$$f_R(s) = A^T \phi(s) = (a_1^T \phi(s), \ldots, a_d^T \phi(s))^t \qquad (5)$$

where $A = [a_1, \ldots, a_d] \in R^{d_1 \times d}$ is a rank d matrix ($d \leq d_1$).

After the linear relaxation of Eq. (5), the first constraint (Eq. (2)) simply means that the data be centered, i.e., have zero mean. Here $\Phi$ is centered by subtracting the mean of $\Phi$ from every $\Phi(S) \in \Phi$ to get $\hat{\Phi}$.

Given the above relaxation, the following optimization problem can be formulated:

$$\text{minimize}: Tr A^T \hat{\Phi} K \hat{\Phi}^T A \qquad (6)$$

s.t.:

$$A^T \hat{\Phi} \hat{\Phi}^T A = \rho^2 I_d \qquad (7)$$

where L is the graph Laplacian for the similarity matrix W defined by the pairwise similarities w(s, s').

This minimization task can be transformed into a generalized Eigenvalue problem and solved efficiently using either Cholesky factorization or the QZ algorithm:

$$\hat{\Phi} L \hat{\Phi}^T A = \hat{\Phi} \hat{\Phi}^T A \Lambda \qquad (8)$$

where $\Lambda$ is a d×d diagonal matrix.

Once A has been estimated from the training data, the codeword of a name a can be produced by binarizing each coordinate of $f_R(s)$:

$$f(s) = (sgn(a_1^T \phi(s)), \ldots, sgn(a_d^T \phi(s)))^T \qquad (9)$$

where sgn(u)=1 if u>0 and −1 otherwise for all u∈R.

It is noted that in one implementation, the top 32 Eigenvectors found via Eq. (8) where chosen to form the hash function resulting in the output of a 32 bit codeword (i.e., d=32). It was found that a 32 bit codeword provided an acceptable tradeoff between retrieval accuracy and speed. However, it is not intended that the personal name spelling correction suggestion technique embodiments described herein be limited to 32 bit codewords. Codewords of other bit lengths can be employed as desired.

Figure 3:
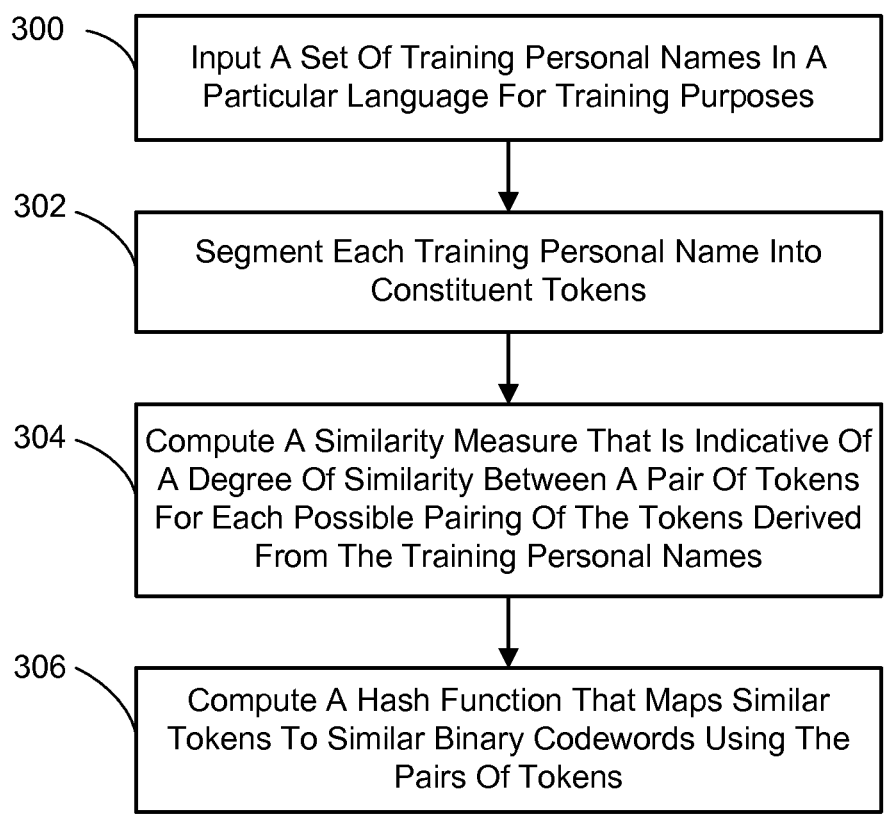
FIG. 3 is a flow diagram generally outlining an implementation of the part of the processes of FIGS. 1 and 2 involving computing a hash function that maps any personal name in a particular language and misspellings thereof to similar binary codewords using monolingual data.

In view of the foregoing, one implementation of computing a hash function that maps any personal name in a particular language and misspellings thereof to similar binary codewords using monolingual data is accomplished as follows. Referring to FIG. 3, first a set of training personal names in a particular language is input for training purposes (300). Each training personal name is then segmented into constituent tokens (302). A similarity measure that is indicative of a degree of similarity between a pair of tokens is computed next for each possible pairing of the tokens derived from the training personal names (304). A hash function is then computed that maps similar tokens to similar binary codewords using the pairs of tokens as described previously (306). In one implementation this is accomplished by finding the hash function wherein the summation of the product of the similarity measure computed for a pair of tokens and the distance between the codewords produced by the hash function for that pair of tokens, over all possible pairings of the tokens derived from the training personal names, is minimized. In cases where the names are featurized, each token is represented as a vector of features, and the aforementioned similarity measure computes the similarity between featurized tokens in the pair of featurized tokens under consideration. Further, the hash function is computed so as to map similar featurized tokens to similar binary codewords.

1.1.2 Learning Hash Functions Using Multilingual Equivalent Names as Training Data As indicated previously, learning hash functions using multilingual equivalent personal names as training data involves two or more different languages. For example, in one tested two-language implementation, the languages chosen were English and Hindi. However, the personal name spelling correction suggestion technique embodiments described herein are not limited to just two language implementations, or to the tested languages. For example, but without limitation, other languages (and scripts) that could be used include Russian, Greek, Hebrew, Arabic, among others. In addition, any combination of two or more languages can be used. For example, a three-language implementation might employ English, Hindi and Russian to learn the aforementioned hash functions.

In general, the task of learning hash functions using multilingual equivalent names is formulated as an optimization problem whose relaxation can be solved as a generalized Eigenvalue problem. For example, consider an implementation using two languages. Let (s,t) be a pair of name s and its equivalent t in a different language. Given the set T={(s,t)} as the training data (in one tested two-language implementation, about 15,000 pairs of parallel single token names in English-Hindi were employed), let $\phi(s) \in R^{d_1}$ (and resp. $\psi(t) \in R^{d_2}$) be the feature representation of s (and resp. t). The task is to learn a pair of hash functions $f, g$ that map names to d bit codewords: $f:s \mapsto \{-1,1\}^d$, $g:t \mapsto \{-1,1\}^d$. In addition, it is desired that the distance (e.g., Hamming distance) of the codeword of a name to the codeword of its equivalent be made small. Further, it is desired that each bit of the codewords be either 1 or −1 with equal probability and that the successive bits of the codewords to be uncorrelated. These desires can be achieved using the following optimization equation:

$$\text{minimize}: \Sigma_{(s,t) \in T} ||f(s) - g(t)||^2 \qquad (10)$$

s.t.:

$$\Sigma_{s:(s,t) \in T} f(s) = 0 \qquad (11)$$

$$\Sigma_{t:(s,t) \in T} g(t) = 0 \qquad (12)$$

$$\Sigma_{s:(s,t) \in T} f(s) f(s)^T = \rho^2 I_d \qquad (13)$$

$$\Sigma_{t:(s,t) \in T} g(t) g(t)^T = \rho^2 I_d \qquad (14)$$

$$f(s), g(t) \in \{-1,1\}^d \qquad (15)$$

where $I_d$ is an identity matrix of size d×d.

As it is desired that f (and resp. g) to be defined for all s (and resp. t), f (and resp. g) are relaxed as follows:

$$f_R(s) = A^T \phi(s) \qquad (16)$$

$$g_R(t) = B^T \psi(s) \qquad (17)$$

where $A = [a_1, \ldots, a_d] \in R^{d_1 \times d}$ and $B = [b_1, \ldots, b_d] \in R^{d_2 \times d}$ are rank d matrices. As before, $\Phi$ and $\psi$ are centered to get $\hat{\Phi}$ and $\hat{\Psi}$ respectively.

Given the above relaxation, the following optimization problem can be formulated:

$$\text{minimize}: TrH(A,B;\hat{\Phi},\hat{\Psi}) \quad (18)$$

s.t.:

$$A^T\hat{\Phi}\hat{\Phi}^T A = \rho^2 I_d \quad (19)$$

$$B^T\hat{\Psi}\hat{\Psi}^T B = \rho^2 I_d \quad (20)$$

where $H(A,B;\hat{\Phi},\hat{\Psi}) = (A^T\hat{\Phi} - B^T\hat{\Psi})(A^T\hat{\Phi} - B^T\hat{\Psi})^T$.

This minimization can be solved as a generalized Eigenvalue problem:

$$\hat{\Phi}\hat{\Psi}^T B = \hat{\Phi}\hat{\Phi}^T A \Lambda \quad (21)$$

$$\hat{\Psi}\hat{\Phi}^T A = \hat{\Phi}\hat{\Phi}^T B \Lambda \quad (22)$$

where $\Lambda$ is a d×d diagonal matrix. Further, Equations (21) and (22) find the canonical coefficients of $\hat{\Phi}$ and $\hat{\Psi}$. Here again in one implementation, the top 32 Eigenvectors found via Eqs. (21) and (22) where chosen to form hash functions resulting in the output of a 32 bit codeword (i.e., d=32).

As with monolingual learning, the codeword of s is obtained by binarizing the coordinates of $f_R(s)$:

$$f(s) = (sgn(a_1^T\phi(s)), \ldots, sgn(a_d^T\phi(s)))^T \quad (23)$$

It is noted that as a biproduct, it is possible to hash names in the second language using g:

$$g(t) = (sgn(b_1^T\psi(t)), \ldots, sgn(b_d^T\psi(t)))^T \quad (24)$$

Extension of the foregoing two-language example, to add one or more additional languages is straightforward. Let $O = \{o_i\}_{i=1}^n$ be a set of multi-view data objects and $x_i^{(k)}$ be the $k^{th}$ view of the object $o_i$, where $x_i^{(k)} \in \mathbb{R}^{d_k}$. Let w be the similarity matrix for O with $W_{ij}$ being the similarity between $o_i$ and $o_j$. Given O and W as input (when W is not available, assume that $W=I_n$), it is desired to learn a hash function $f^{(k)}: x^{(k)} \mapsto \{-1,1\}^d$ for the kth view, $1 \leq k \leq K$. For the sake of notational simplicity, $f^{(k)}x^{(k)}$ is denoted by $y^{(k)}$ hereafter. Further, let $d(y, y')$ denote the Hamming distance between the codewords y and y'. Note that $d(y, y') = \frac{1}{4}\|y-y'\|^2$.

As it is desired to enable cross-view similarity search through hashing, the hash functions will map similar objects to similar codewords over all the views. More specifically, if $o_i$ and $o_j$ are two similar data objects, each of the hash functions $f^{(k)}$ will to map $o_i$ and $o_j$ to similar codewords. Now, the Hamming distance between the codewords of $o_i$ and $o_j$ summed over all the views is $$d_{ij} = \sum_{k=1}^K d(y_i^{(k)}, y_j^{(k)}) + \sum_{k=1}^K \sum_{k'>k}^K d(y_i^{(k)}, y_j^{(k')}) \quad (25)$$

Hash functions are sought that minimize the similarity weighted Hamming distance between the codewords of the training data objects. Further, along the lines of the two language hash learning scheme, a couple of constraints are imposed: first, each bit will have an equal chance of being 1 or −1; second, the bits will be uncorrelated. Thus, the following problem is arrived at which is a generalization of Spectral Hashing to multiview data objects:

$$\text{minimize } \bar{d} + \sum_{i=1}^n \sum_{j=1}^n W_{ij} d_{ij} \quad (26)$$

$$\text{subject to: } Y^{(k)} e = 0, \text{ for } k = 1, \ldots, K \quad (27)$$

$$\frac{1}{n} Y^{(k)} Y^{(k)T} = I_d, \text{ for } k = 1, \ldots, K \quad (28)$$

$$Y_{ij}^{(k)} \in \{-1, 1\}, \text{ for } k = 1, \ldots, K \quad (29)$$

where e is a n×1 vector of all 1s and $I_d$ is an identity matrix of size d×d. From Equations (25) and (26), it follows easily that:

$$\bar{d} = \sum_{k=1}^K Tr(Y^{(k)} L' Y^{(k)T}) - 2 \sum_{k=1}^K \sum_{k'>k}^K Tr(Y^{(k)} W Y^{(k')T}) \quad (30)$$

where $L' = 2L + (K-1)D$, D is a diagonal matrix such that $D_{ii} = \sum_{j=1}^n D_{ij}$ and $L = D - W$ is the Laplacian. Note that $\bar{d}$ is a convex function of Y.

The foregoing optimization problem is NP hard as it reduces trivially to the optimization problem when K=1 and the latter is known to be NP hard.

Assume that $y_i^{(k)}$ is a low-dimensional linear embedding of $x_i^{(k)}$ but make no assumption on the distribution of the data objects:

$$y_i^{(k)} = A^{(k)T} x_i^{(k)} \quad (31)$$

where $A^{(k)} = [a_1^{(k)}, \ldots, a_d^{(k)}] \in \mathbb{R}^{d_k \times d}$ is a rank d matrix (d<$d_k$). The above relaxation has two effects: first, it transforms the NP hard optimization problem into a tractable problem that can be solved as a generalized eigenvalue problem; second, it imposes additional structure on the form of the hash functions:

$$f^{(k)}(x^{(k)}) = (sgn(<a_1^{(k)}, x^{(k)}>), \ldots, sgn. \quad (32)$$

Post relaxation the problem can be rewritten as follows:

$$\text{minimize } \bar{d} \quad (33)$$

$$\text{subject to: } X^{(k)} e = 0, \text{ for } k = 1, \ldots, K \quad (34)$$

$$\frac{1}{n} A^{(k)T} X^{(k)} X^{(k)T} A^{(k)} = I_d, \text{ for } k = 1, \ldots, K \quad (35)$$

The constraint in Eq. (34) simply means that the data objects should have zero mean in each of the views. This can be easily ensured by centering the data objects.

The relaxed objective function is $$\bar{d} = \sum_{k=1}^K Tr(A^{(k)T} X^{(k)} L X^{(k)T} A^{(k)}) - 2\sum_{k=1}^K \sum_{k'>k}^K Tr(A^{(k)T} X^{(k)} W X^{(k')T} A^{(k')}) \quad (36)$$

which is convex in $A^{(k)}$, k=1, …, K.

The problem of learning hash functions has now been transformed into a parameter estimation problem. To estimate the parameters $A^{(k)}$, each of the partial derivatives of $\bar{d} - Tr(A^{(k)T} X^{(k)} X^{(k)T} A^{(k)} \Lambda)\}$ is set to 0 where $\Lambda$ is a d×d diagonal matrix. This results in the following generalized eigenvalue problem which can be solved in polynomial time:

$$X^{(k)} L' X^{(k)T} A^{(k)} - \sum_{k' \neq k}^K X^{(k)} W X^{(k')T} A^{(k')} = X^{(k)} X^{(k)T} A^{(k)} \Lambda \quad (37)$$

Figure 4:
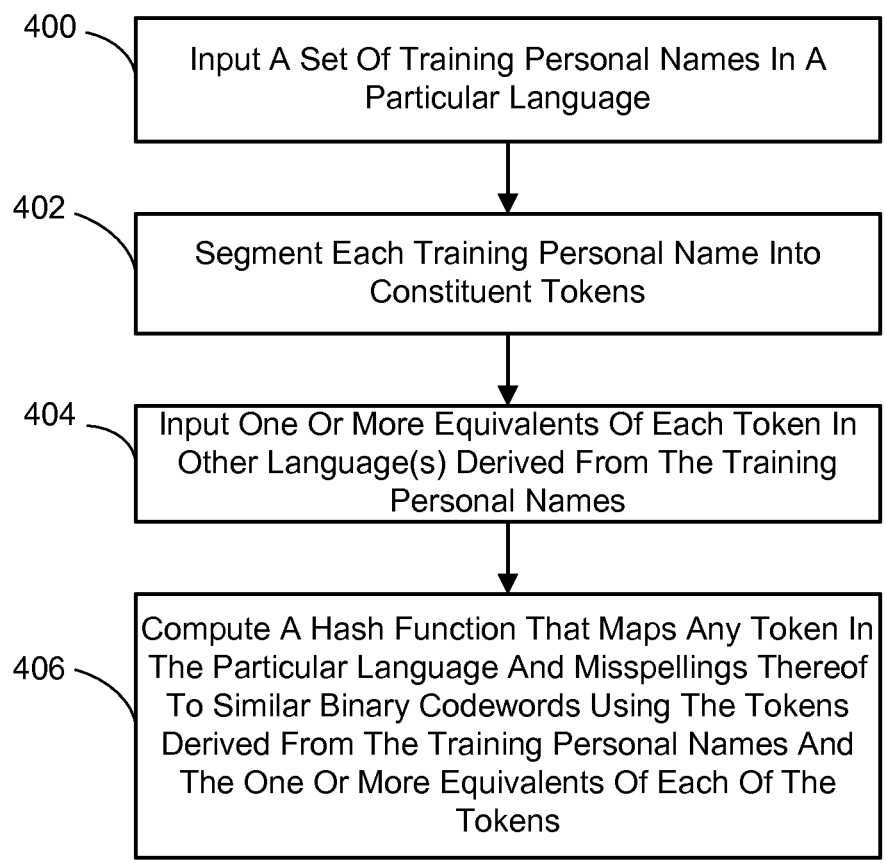
FIG. 4 is a flow diagram generally outlining an implementation of the part of the processes of FIGS. 1 and 2 involving computing a hash function that maps any personal name in a particular language and misspellings thereof to similar binary codewords using multilingual data.

In view of the foregoing, one implementation of computing a hash function that maps any personal name in a particular language and misspellings thereof to similar binary codewords using multilingual data is accomplished as follows. Referring to FIG. 4, first a set of training personal names in the aforementioned particular language are input (400). Each training personal name is then segmented into constituent tokens (402). One or more equivalents of each token in other languages, derived from of the training personal names, are input as well (404). Each equivalent is in a different language than the aforementioned particular language of the token, and is in a language that is different than the other equivalents of the token that were inputted. In addition, the language or languages of the one or more equivalents are the same for every token. Next, a hash function is computed that maps any token in the particular language and misspellings thereof to similar binary codewords using the tokens derived from the training personal names and the one or more equivalents of each of the tokens (406).

It is noted that the personal name tokens can be featurized prior to being used to compute the hash function. In cases where the name tokens are featurized, each token is represented as a vector of features, as are the equivalents of each token in the other languages. As such, the hash function is computed so as to map a featurized version of any token in the particular language and featurized versions of misspellings of that token to similar binary codewords using the featurized tokens derived from of the training personal names and the one or more featurized equivalents of each of the tokens.

1.2 Indexing a Personal Name Directory

Figure 5:
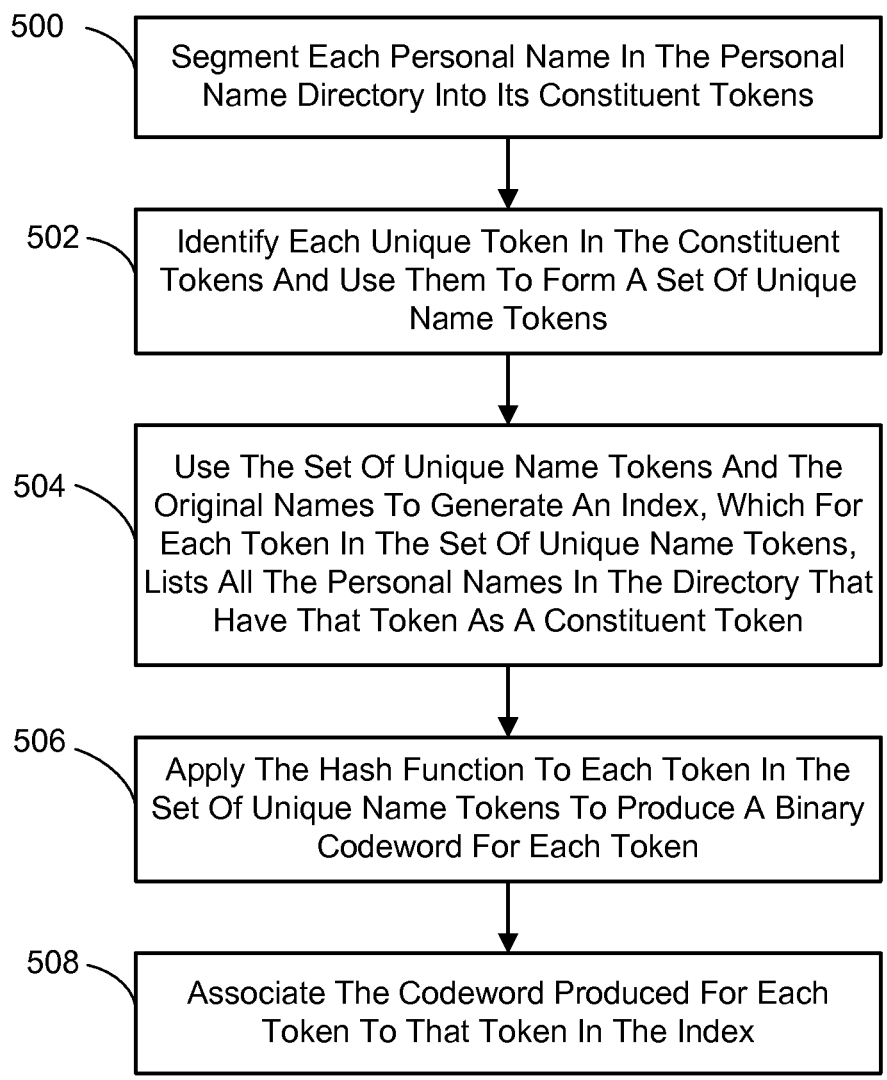
FIG. 5 is a flow diagram generally outlining an implementation of the part of the process of FIG. 1 involving indexing a personal name directory made up of numerous names in the language associated with the hash function to make it queryable.

Once the aforementioned hash function is computed, a personal name directory made up of numerous names in the language associated with the hash function is indexed to make it queryable. More particularly, referring to FIG. 5, given such a personal name directory, each personal name is segmented into its constituent tokens (500). Each unique token in the resulting constituent tokens is then identified and used to form a set of unique name tokens (502). Using the set of unique name tokens and the original names, an index is generated, which for each token in the set of unique name tokens, lists all the personal names in the directory that have that token as a constituent token (504). In addition, one of the aforementioned hash functions is applied to each token in the set of unique name tokens to produce a d bit binary codeword for each token as described previously (506), and the codeword is associated with that token in the index (508).

It is noted that the personal name tokens can be featurized prior to being hashed and indexed. In cases where the name tokens are featurized, each token is represented as a vector of features, and the hash function is applied to each featurized unique token to produce the binary codeword representation thereof.

1.3 Querying the Personal Name Directory for Spelling Correction Suggestions

Once the personal name directory index is built, it can be queried for personal name spelling correction suggestions. In general, this is accomplished by submitting a personal name for which spelling correction suggestions are sought. The submitted personal name query is then tokenized and hashed in the same manner as described previously in connection with building the directory index. The resulting binary codewords generated from the query name tokens are then compared to the codewords in the directory index to ultimately identify similar personal names. One or more of the discovered similar names are then provided to the querying user.

Figure 6:
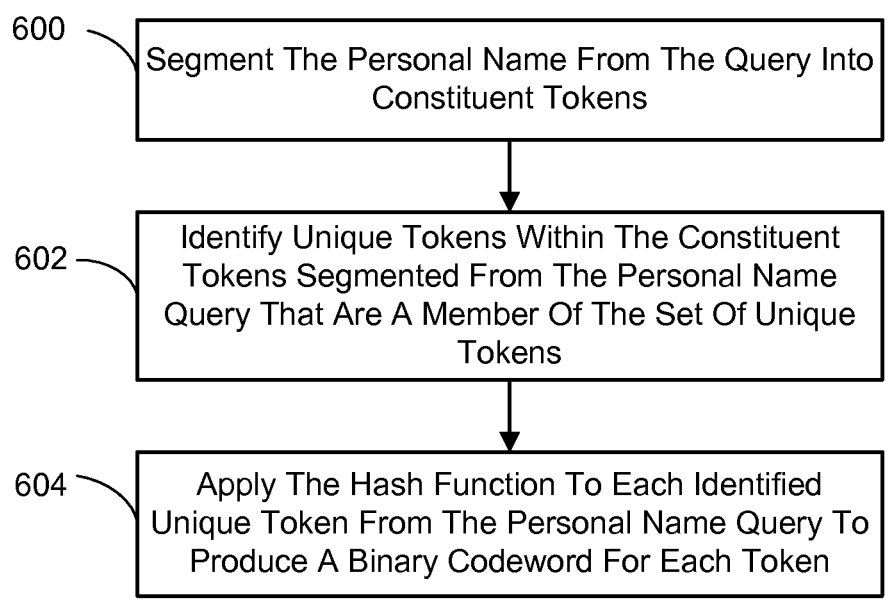
FIG. 6 is a flow diagram generally outlining an implementation of the part of the process of FIG. 2 involving the tokenizing and hashing of a personal name included in a query.

In one implementation, the tokenizing and hashing of the personal name included in the query is accomplished as follows. Referring to FIG. 6, the personal name from the query is first segmented into constituent tokens (600). Unique tokens within the constituent tokens segmented from the personal name query that are a member of the aforementioned set of unique tokens, are then identified (602). The hash function is then applied to each identified unique token from the personal name query to produce a binary codeword for each of the identified unique tokens (604).

If the personal name directory index was generated using featurized tokens, then the personal name included in the query would be featurized before hashing as well. To this end, in cases where the name tokens are featurized, each identified unique token from the personal name query is represented as a vector of features, and the hash function is applied to each featurized unique token from the personal name query to produce a binary codeword for each of these featurized tokens.

In operation, the foregoing querying procedure is accomplished in two stages—namely a name bucketing stage and a name matching stage. These two stages will now be described.

1.3.1 Name Bucketing

Given a personal name query that has been broken up into its constituent tokens $Q=s_1 s_2 \ldots s_J$, each token $s_i$ is hashed into a codeword $y_i$ using the appropriate previously learned hash function (i.e., the hash function learned from the monolingual training names, or the hash function learned for the language of the query when multilingual training names were employed). For each of the resulting query codewords $y_i$, those codewords $y_i'$ in the previously built directory index that are at a prescribed distance (e.g., Hamming distance) of r or less from $y_i$ are identified. For example, in tested embodiments, a Hamming distance of 4 was used. The name tokens corresponding to each of the identified codewords are then retrieved from the index and ranked. In one implementation, this ranking involves the use of a unique token-level similarity scoring procedure.

In one implementation, this token-level similarity scoring entails the use of a logistic function applied over multiple distance measures to compute the similarity score between name tokens s from the query and s' of the name tokens corresponding to the identified codewords retrieved from the index. For example, this token-level similarity scoring function can take the form of:

$$K(s, s') = \frac{1}{1 + e^{-\Sigma_i \alpha_i d_i(s,s')}}. \tag{38}$$

where $K(s, s')$ is the token-level similarity score between s and s', $d_i$ is the $i^{th}$ distance measure and $\alpha_i$ is a weighting factor for the $i^{th}$ distance measure.

While a variety of distance measures can be employed in Eq. (25), two appropriate choices are the normalized Damerau-Levenshtein edit distance between s and s' and the Hamming distance between the codewords of s and s', $(\|f(S)-f(s')\|)$ It is noted that when the normalized Damerau-Levenshtein edit distance is employed, it has been found that the continuous relaxation $\|f_R(s)-f_R(s')\|$ provided better results than $\|f(s)-fs'\|$ and hence can be used as a substitute as desired. It is further noted that the weighting factor $\alpha_i$ for each similarity measure can be established empirically using a set of known similar and dissimilar examples.

Once the name tokens corresponding to each of the aforementioned identified codewords retrieved from the index are ranked, a prescribed number (e.g., 100) of the highest ranking tokens are retained. The retained tokens are then used to retrieve all the personal names associated therewith in the personal name directory index to form a pool of candidate personal names for use in the name matching stage.

Figure 7A:
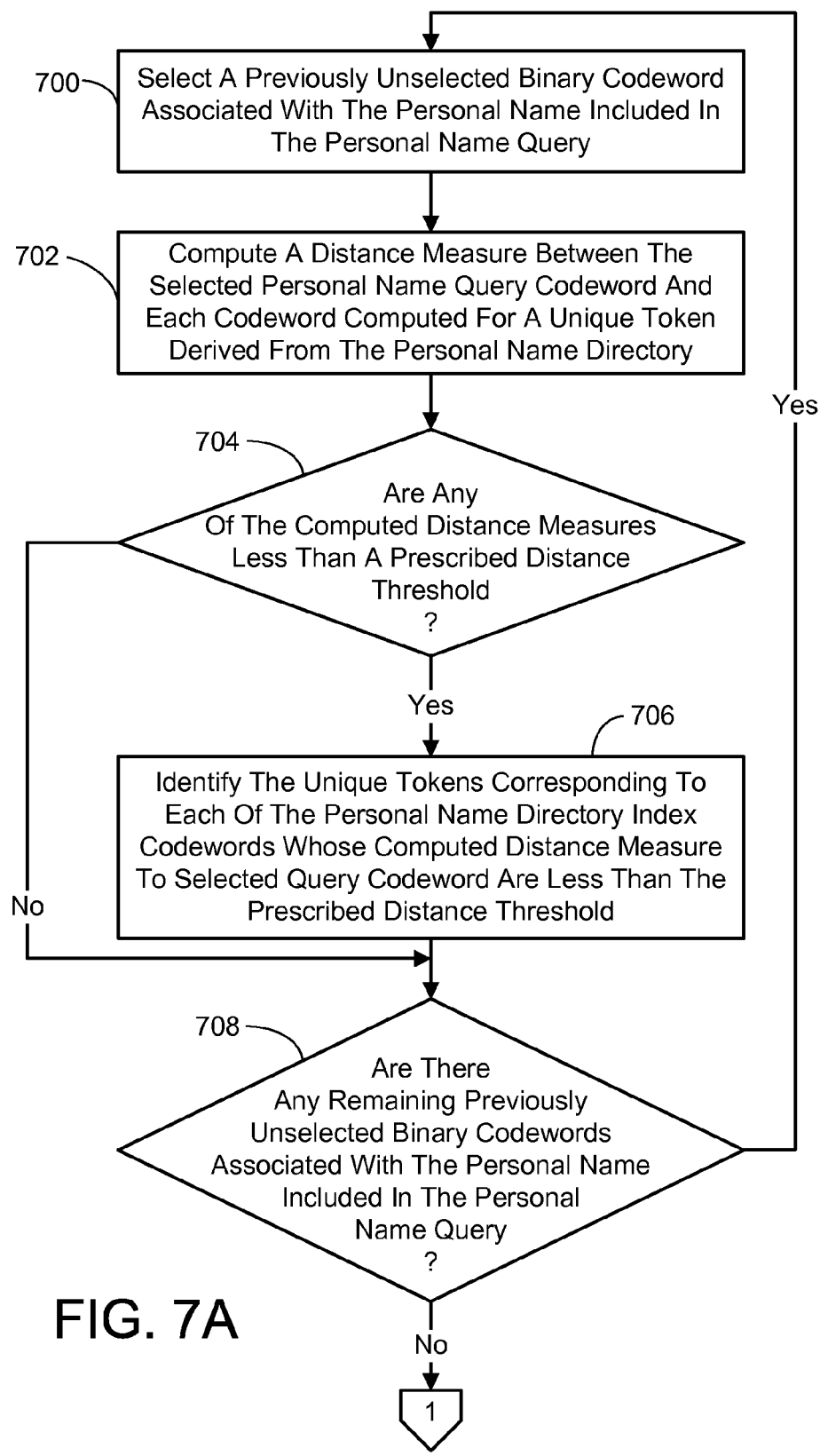
FIGS. 7A-B are a continuing flow diagram generally outlining an implementation of the part of the process of FIG. 2 involving a name bucketing procedure performed as part of the querying process.
Figure 7B:
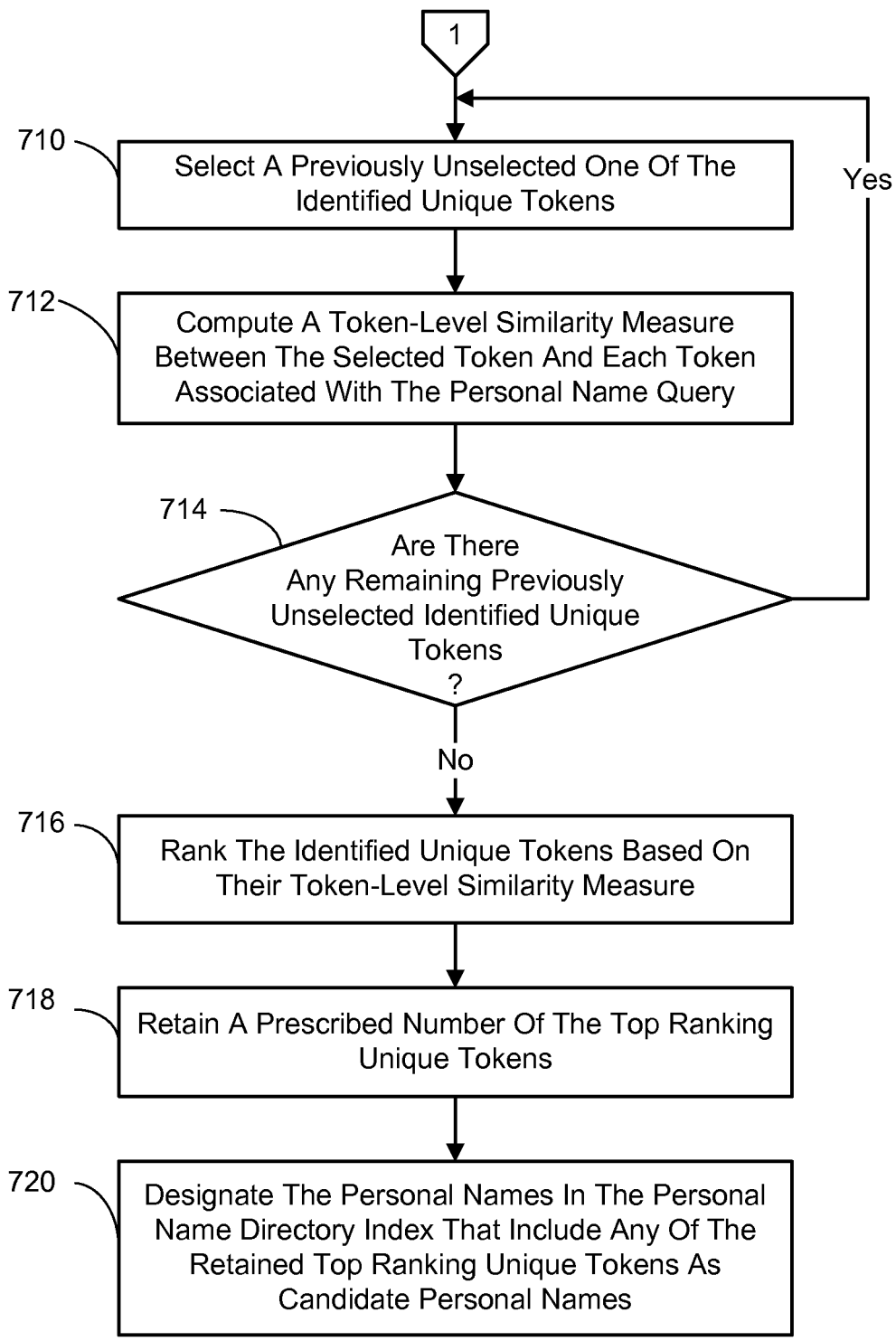

In one exemplary implementation, the foregoing name bucketing procedure is accomplished as follows. Referring to FIGS. 7A-B, a previously unselected binary codeword associated with the personal name included in the personal name query is selected (700). A distance measure is then computed between the personal name query codeword and each codeword computed for a unique token derived from the personal name directory (702). It is then determined if any of the computed distance measures are less than a prescribed distance threshold (704). If so, the unique tokens corresponding to each of the personal name directory index codewords whose computed distance measure to the selected query codeword are less than a prescribed distance threshold, are identified (706). If not, no action is taken, but either way, it is next determined if there are any remaining previously unselected binary codewords associated with the personal name included in the personal name query (708). If there are, then process actions 700 through 708 are repeated as appropriate.

When all the binary codeword associated with the personal name included in the personal name query have been selected and processed, a previously unselected one of the identified unique tokens is selected (710), and a token level similarity measure is computed between the selected token and each token associated with the personal name query (712). It is then determined if there are any remaining previously unselected identified unique tokens (714). If so, process actions 710 through 714 are repeated. Otherwise, the identified unique tokens are ranked based on their computed token-level similarity measure (716). A prescribed number of the top ranking unique tokens are retained (718), and the personal names in the personal name directory index that include any of the retained top ranking unique tokens are designated as candidate personal names (720).

1.3.2 Name Matching

In general, the name matching task involves finding the best match, or up to a prescribed number (e.g., 10) of the top scoring matches, between the personal name query and the candidate personal names from the candidate pool. However, it is pointed out that the query and personal names in the candidate pool will typically have multiple name parts (i.e., multiple words or tokens making up the personal name). Thus, a measure of similarity between the full personal name in the query and each of the full candidate names in the candidate pool is computed. This can be done using the individual token-level similarity scores computed for each token associated with both the query and the names in the candidate pool. In one implementation, this multi-token name similarity measure is computed as follows.

Let $Q=s_1 s_2 \ldots s_I$ and $D=s'_1 s'_2 \ldots s'_J$ be two multi-token names, where, as before, Q corresponds to the personal name query, and where D corresponds to one of the candidate personal names from the candidate pool. To compute the similarity between Q and D, a weighted bipartite graph is formed with a node for each $s_i$ and a node for each $s'_j$, and with the edge weight between each node being set to the previously computed token-level similarity measure $K(s_i, s'_j)$. The weight ($K_{max}$) of the maximum weighted matching in this graph is then computed. This maximum weighted matching represents the greatest possible sum of the individual edge weights following a node-to-node path through the graph. It is noted that in practice, a maximal matching computed using a greedy approach suffices since many of the edges in the bipartite graph will typically have a low weight.

Given the foregoing, in one implementation the similarity between Q and D is computed as:

$$K(Q, D) = \frac{K_{max}}{|I - J| + 1}. \quad (39)$$

where K(Q,D) is the similarity score between the personal name query Q and a candidate personal name D, I is the number of tokens in the personal name query Q and j is the number of tokens in the candidate personal name D.

Figure 8:
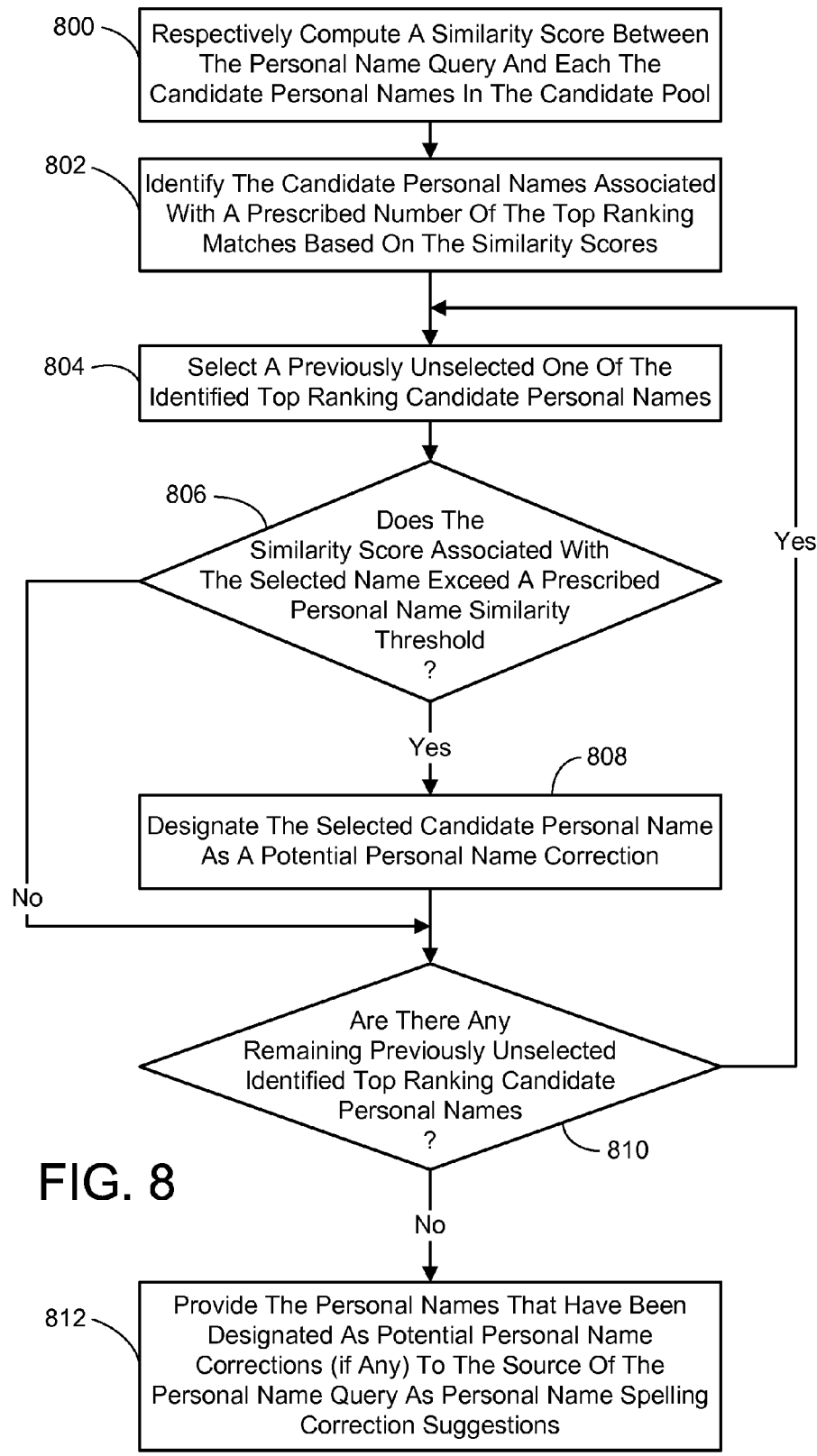
FIG. 8 is a flow diagram generally outlining an implementation of the part of the process of FIG. 2 involving a name matching procedure performed as part of the querying process.

In one exemplary implementation, the foregoing name matching procedure is accomplished as follows. Referring to FIG. 8, a similarity score is respectively computed between the personal name query and each the candidate personal names in the pool in the manner described above (800). The candidate personal names associated with a prescribed number of the top ranking matches are then identified (802). The identified top ranking matches are considered to be the candidate personal names from the personal name directory that most closely match the personal name from the query. Next, a previously unselected one of the identified top ranking candidate personal names is selected (804), and it is ascertained if the similarity score associated with the selected name exceeds a prescribed empirically-derived personal name similarity threshold (806). For example, in tested embodiments, the similarity threshold was set to 0.75. If it does exceed the threshold, the selected candidate personal name is designated as a potential personal name correction (808). If not no action is taken, however in either case, it is determined if there are any remaining previously unselected identified top ranking candidate personal names (810). If so, process actions 804 through 810 are repeated. When all the identified top ranking candidate personal names have been selected and processed, those that have been designated as potential personal name corrections (if any) are provided to the source of the personal name query as personal name spelling correction suggestions (812).

It is noted that the foregoing check to ensure the top ranking candidate personal names have a score that exceeds the similarity threshold is why it was indicated previously that up to a prescribed number of the top scoring matches are identified in the name matching task. While a prescribed number of candidate personal names are involved, some of them may not pass the similarity threshold test, and so not make the final list of potential personal name corrections.

2.0 The Computing Environment

A brief, general description of a suitable computing environment in which portions of the personal name spelling correction suggestion technique embodiments described herein may be implemented will now be described. The technique embodiments are operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 9:
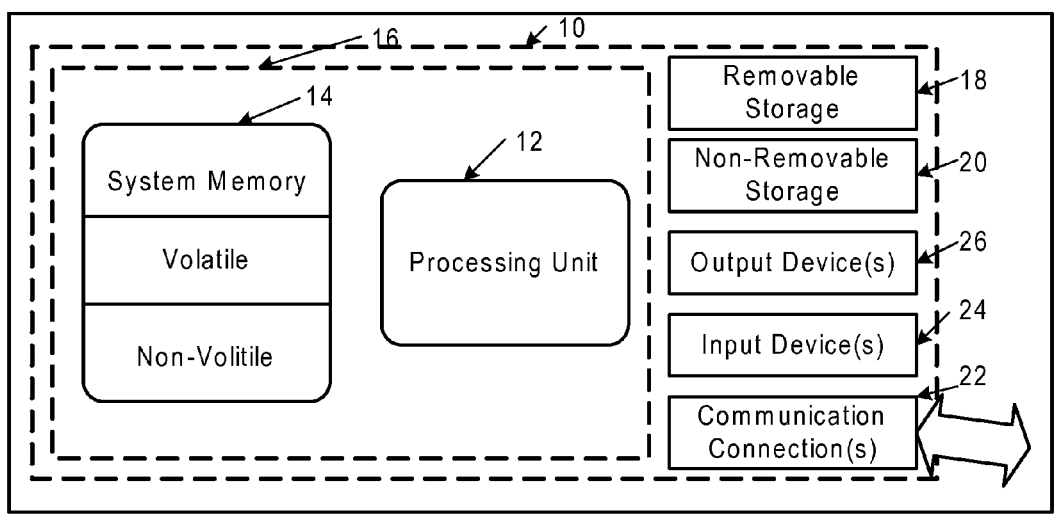
FIG. 9 is a diagram depicting a general purpose computing device constituting an exemplary system for implementing personal name spelling correction suggestion technique embodiments described herein.

FIG. 9 illustrates an example of a suitable computing system environment. The computing system environment is only one example of a suitable computing environment and is not intended to suggest any limitation as to the scope of use or functionality of personal name spelling correction suggestion technique embodiments described herein. Neither should the computing environment be interpreted as having any dependency or requirement relating to any one or combination of components illustrated in the exemplary operating environment. With reference to FIG. 9, an exemplary system for implementing the embodiments described herein includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated in FIG. 9 by dashed line 16. Additionally, device may also have additional features/functionality. For example, device 10 may also include additional storage (removable and/or non-removable) including, but not limited to, magnetic or optical disks or tape. Such additional storage is illustrated in FIG. 9 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and non-removable storage 20 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Device 10 may also have input device(s) 24 such as keyboard, mouse, pen, voice input device, touch input device, camera, etc. Output device(s) 26 such as a display, speakers, printer, etc. may also be included. All these devices are well known in the art and need not be discussed at length here.

The personal name spelling correction suggestion technique embodiments described herein may be further described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices. Still further, the aforementioned instructions could be implemented, in part or in whole, as hardware logic circuits, which may or may not include a processor.

3.0 Other Embodiments

In the foregoing description of learning hash functions using multilingual equivalent names as training data it was mentioned that the names could be in different scripts. However, in an alternate implementation where the languages involved are not in English, the name tokens and/or their equivalents in another language can be Romanized first and then featurized. For example consider the Chinese equivalent 迈克尔 the name token "Michael". This is Romanized to "Maikeer" and then featurized into {^m, mi, ic, ch, ha, ae, el, l$}.

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for creating a personal name directory which can be queried to suggest spelling corrections for personal names, comprising:
    using a computer comprising a processing unit and a memory to perform the following process actions:
    computing a hash function that maps any personal name in a particular language and misspellings thereof to similar binary codewords; and
    for each personal name in a directory of personal names in said particular language, using said hash function to produce one or more binary codewords and associating the said codeword or codewords with the personal name.

2. The process of claim 1, wherein the process action of computing the hash function that maps any personal name in a particular language and misspellings thereof to similar binary codewords, comprises the action of:
    inputting a set of training personal names in said particular language for training purposes;
    segmenting each training personal name into constituent tokens, wherein each token corresponds to a word in the personal name comprising a continuous string of characters unbroken by a space and whose characters are consistent with the types of characters employed in personal names in said particular language;
    for each possible pairing of the tokens derived from the training personal names, computing a similarity measure that is indicative of a degree of similarity between the tokens in the pair under consideration; and
    computing a hash function that maps similar tokens to similar binary codewords using said pairs of tokens, wherein said computation comprises finding a hash function wherein the summation of the product of the similarity measure computed for a pair of tokens and the distance between the codewords produced by the hash function for that pair of tokens, over all possible pairings of the tokens derived from the training personal names, is minimized.

3. The process of claim 2, wherein the process actions of computing a similarity measure that is indicative of a degree of similarity between the tokens in the pair under consideration and computing a hash function that maps similar tokens to similar binary codewords using said pairs of tokens, comprises the actions of:
    representing each token as a vector of features;
    computing a similarity measure that is indicative of a degree of similarity between the featurized tokens in the pair of featurized tokens under consideration; and
    computing a hash function that maps similar featurized tokens to similar binary codewords using said pairs of featurized tokens.

4. The process of claim 2, wherein the process action of computing the hash function that maps similar tokens to similar binary codewords, comprises an action of characterizing the computation of the hash function as an optimization equation whose relaxation can be solved using a generalized Eigenvalue technique.

5. The process of claim 1, wherein the process action of computing the hash function that maps any personal name in a particular language and misspellings thereof to similar binary codewords, comprises the action of:

inputting a set of training personal names in said particular language;

segmenting each training personal name into constituent tokens, wherein each token corresponds to a word in the personal name comprising a continuous string of characters unbroken by a space and whose characters are consistent with the types of characters employed in personal names in said particular language;

for each token derived from of the training personal names, inputting one or more equivalents of the token in another language or languages, wherein each of said equivalents input for a token is in a language that is different from any other input equivalent of the token, and wherein the language or languages of the one or more equivalents are the same for every token;

computing a hash function that maps any token in the particular language and misspellings thereof to similar binary codewords using said tokens derived from the training personal names and said one or more equivalents of each of the tokens.

6. The process of claim 5, wherein the process action of computing the hash function that maps any token in the particular language and misspellings thereof to similar binary codewords using said tokens derived from the training personal names and said one or more equivalents of each of the tokens, comprises the actions of:

representing each token as a vector of features;

representing the equivalent or equivalents of each token as a vector of features; and computing a hash function that maps the featurized version of any token in the particular language and featurized versions of misspellings of that token to similar binary codewords using said featurized tokens derived from of the training personal names and said one or more featurized equivalents of each of the tokens.

7. The process of claim 5, wherein the process action of computing the hash function that maps any token in the particular language and misspellings thereof to similar binary codewords using said tokens derived from the training personal names and said one or more equivalents of each of the tokens, comprises an action of characterizing the computation of the hash function as an optimization equation whose relaxation can be solved using a generalized Eigenvalue technique.

8. The process of claim 1, wherein the process action of using said hash function to produce one or more binary codewords and associating the codeword or codewords with the personal name, for each personal name in a directory of personal names in said particular language, comprises the actions of:

segmenting each personal name in the personal name directory into constituent tokens, wherein each token corresponds to a word in the personal name comprising a continuous string of characters unbroken by a space and whose characters are consistent with the types of characters employed in personal names in said particular language;

identifying a set of unique tokens from the constituent tokens of the personal names from the personal name directory;

generating an index which for each token in the set of unique tokens identifies all the personal names in the personal name directory that have that token as one of its constituent tokens;

applying said hash function to each unique token to produce a binary codeword representation thereof; and associating the binary codeword produced for each unique token with that token in said index.

9. The process of claim 8, wherein the process action of applying said hash function to each unique token to produce a binary codeword representation thereof, comprises the actions of:

representing each unique token as a vector of features; and applying said hash function to each featurized unique token to produce the binary codeword representation thereof.

10. A computer-implemented process for providing one or more suggested spelling corrections for a personal name included in a personal name query, comprising:

using a computer comprising a processing unit and a memory to perform the following process actions:

inputting a personal name query comprising a personal name in a particular language;

using a hash function to produce one or more binary codewords from the personal name in the personal name query, wherein said hash function maps any personal name in a particular language and misspellings thereof to similar binary codewords;

employing a personal name directory to identify up to a prescribed number of personal names in the personal name directory, each of which has one or more of the associated binary codewords that are similar to one or more of the binary codewords produced from the personal name query;

designating the identified personal names as potential personal name corrections; and suggesting one or more of the potential personal name corrections as alternate names for the personal name from the personal name query.

11. The process of claim 10, wherein said hash function was used to respectively produce and associate one or more binary codewords with each personal name in the personal name directory in said particular language, said producing and associating comprising, segmenting each personal name in the personal name directory into constituent tokens, wherein each token corresponds to a word in the personal name comprising a continuous string of characters unbroken by a space and whose characters are consistent with the types of characters employed in personal names in said particular language, identifying a set of unique tokens from the constituent tokens of the personal names from the personal name directory;

generating an index which for each token in the set of unique tokens identifies all the personal names in the personal name directory that have that token as one of its constituent tokens;

applying said hash function to each unique token to produce a binary codeword representation thereof; and associating the binary codeword produced for each unique token with that token in said index, and wherein the process action of using said hash function to produce one or more binary codewords from the personal name in the personal name query, comprises the actions of:

segmenting the personal name from the query into constituent tokens, wherein each token corresponds to a word in the personal name comprising a continuous string of characters unbroken by a space and whose characters are consistent with the types of characters employed in personal names in said particular language;

identifying unique tokens within the constituent tokens segmented from the personal name query that are a member of said set of unique tokens; and applying said hash function to each identified unique token from the personal name query to produce a binary codeword for each of the identified unique tokens.

12. The process of claim 11, wherein the process action of applying said hash function to each identified unique token from the personal name query to produce a binary codeword for each of the identified unique tokens, comprises the actions of:

representing each identified unique token from the personal name query as a vector of features; and applying said hash function to each featurized unique token from the personal name query to produce a binary codeword for each of the featurized unique tokens.

13. The process of claim 11, wherein the process action of employing a personal name directory to identify up to a prescribed number of personal names in the personal name directory each of which has one or more of its associated binary codewords that are similar to one or more of the binary codewords produced from the personal name query, comprises the actions of:

for each binary codeword associated with the personal name query, respectively computing said distance measure between the personal name query codeword and each codeword computed for a unique token derived from the personal name directory, identifying codewords computed for a unique token derived from the personal name directory that have a computed distance measure from the personal name query codeword that is less than said prescribed distance threshold;

for each unique token corresponding to a one of the identified codewords, respectively computing a token level similarity measure between that token and each token associated with the personal name query;

ranking the unique tokens corresponding to the identified codewords based on their computed similarity measure;

retaining a prescribed number of the top ranking unique tokens;

identifying the personal names in the personal name directory that comprise any of the retained top ranking unique tokens and designate each of these personal names as a candidate personal name;

identifying a prescribed number of the candidate personal names from the personal name directory that most closely match the personal name from the query, wherein a personal name from the directory is deemed to most closely match a query personal name whenever a personal name similarity score computed using the token level similarity measures computed between the tokens of the candidate personal name and personal name from the query is one of said prescribed number of the top ranking candidate personal names based on the personal name similarity scores; and for each of the identified prescribed number of the candidate personal names from the personal name directory that most closely match the personal name from the query, ascertaining if the personal name similarity score computed for the candidate personal name exceeds a prescribed personal name similarity threshold, and designating each candidate personal name whose personal name similarity score is ascertained to exceed the prescribed personal name similarity threshold as potential personal name corrections.

14. The process of claim 13, wherein the process action of respectively computing said distance measure between the personal name query codeword and each codeword computed for a unique token derived from the personal name directory, comprises computing a Hamming distance between the personal name query codeword and each codeword computed for a unique token derived from the personal name directory.

15. The process of claim 13, wherein the process action of, for each unique token corresponding to a one of the identified codewords, respectively computing a token level similarity measure between that token and each token associated with the personal name query, comprises an action of employing a logistic function applied over multiple distance measures to compute the token level similarity measure.

16. The process of claim 15, wherein the multiple distance measures between tokens comprise a normalized Damerau-Levenshtein edit distance measure between the tokens and a Hamming distance between codewords corresponding to the tokens.

17. The process of claim 13, wherein the process action of computing the personal name similarity score between the tokens of a candidate personal name and personal name from the query, comprises the action of:

constructing a weighted bipartite graph comprising a node for each token of the candidate personal name and for each token of the personal name from the query, and an edge weight assigned between each possible pair of nodes in the graph that is equal to a token-level similarity measure computed between the tokens associated with the pair of nodes;

computing a value of the maximum weighted bipartite matching for the graph; and dividing the maximum weighted bipartite matching value by the absolute value of the difference between the number of tokens in the candidate personal name and the number of tokens in the query personal name, plus one, to produce the personal name similarity score for the candidate personal name.

18. A computer-implemented process for suggesting spelling corrections for personal names, comprising:

using a computer comprising a processing unit and a memory to perform the following process actions:

computing a hash function that maps any personal name in a particular language and misspellings thereof to similar binary codewords;

for each personal name in a directory of personal names in said particular language, using said hash function to produce one or more binary codewords and associating the said codeword or codewords with the personal name;

inputting a personal name query comprising a personal name in said particular language;

using said hash function to produce one or more binary codewords from the personal name in the personal name query;

identifying up to a prescribed number of personal names in the personal name directory each of which has one or more of its associated binary codewords that are similar to one or more of the binary codewords produced from the personal name query and designating the identified personal names as potential personal name corrections; and suggesting one or more of the potential personal name corrections as alternate names for the personal name from the personal name query.

19. The process of claim 18, wherein the process action of computing the hash function that maps any personal name in a particular language and misspellings thereof to similar binary codewords, comprises the action of:

- inputting a set of training personal names in said particular language for training purposes;
- segmenting each training personal name into constituent tokens, wherein each token corresponds to a word in the personal name comprising a continuous string of characters unbroken by a space and whose characters are consistent with the types of characters employed in personal names in said particular language;
- for each possible pairing of the tokens derived from the training personal names, computing a similarity measure that is indicative of a degree of similarity between the tokens in the pair under consideration; and
- computing a hash function that maps similar tokens to similar binary codewords using said pairs of tokens, wherein said computation comprises finding a hash function wherein the summation of the product of the similarity measure computed for a pair of tokens and the distance between the codewords produced by the hash function for that pair of tokens, over all possible pairings of the tokens derived from the training personal names, is minimized.

20. The process of claim 18, wherein the process action of computing the hash function that maps any personal name in a particular language and misspellings thereof to similar binary codewords, comprises the action of:

- inputting a set of training personal names in said particular language;
- segmenting each training personal name into constituent tokens, wherein each token corresponds to a word in the personal name comprising a continuous string of characters unbroken by a space and whose characters are consistent with the types of characters employed in personal names in said particular language;
- for each token derived from of the training personal names, inputting one or more equivalents of the token in another language or languages, wherein each of said equivalents input is in a language that is different any other input equivalents of the token, and wherein the language or languages of the one or more equivalents are the same for every token;
- computing a hash function that maps any token in the particular language and misspellings thereof to similar binary codewords using said tokens derived from the training personal names and said one or more equivalents of each of the tokens.

* * * * *